United States Patent
Inomata

(10) Patent No.: US 9,873,327 B2
(45) Date of Patent: Jan. 23, 2018

(54) DRIVING SUPPORT APPARATUS

(71) Applicant: TOYOTA JIDOSHA KABUSHIKI KAISHA, Toyota-shi, Aichi-ken (JP)

(72) Inventor: Ryo Inomata, Ashigarakamigun (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/357,121

(22) Filed: Nov. 21, 2016

(65) Prior Publication Data

US 2017/0197506 A1 Jul. 13, 2017

(30) Foreign Application Priority Data

Jan. 7, 2016 (JP) .................. 2016-001598

(51) Int. Cl.
*G06F 7/70* (2006.01)
*B60K 31/16* (2006.01)
*B60K 31/00* (2006.01)
*B60T 7/14* (2006.01)
*B60K 28/06* (2006.01)

(52) U.S. Cl.
CPC .......... *B60K 31/16* (2013.01); *B60K 31/0008* (2013.01); *B60K 28/06* (2013.01); *B60T 7/14* (2013.01)

(58) Field of Classification Search
CPC .... B60K 28/06; B60K 31/16; B60K 31/0008; B60T 7/14; G08B 21/02

USPC ...................................... 701/41, 70
See application file for complete search history.

(56) References Cited

U.S. PATENT DOCUMENTS

| | | | | |
|---|---|---|---|---|
| 2004/0039513 | A1* | 2/2004 | Knoop | B60T 7/22 701/70 |
| 2009/0210114 | A1* | 8/2009 | Baumann | B60R 21/0132 701/45 |
| 2013/0018549 | A1* | 1/2013 | Kobana | B60K 28/06 701/41 |

FOREIGN PATENT DOCUMENTS

JP 2013-228928 A 11/2013

* cited by examiner

*Primary Examiner* — Gertrude Arthur Jeanglaude
(74) *Attorney, Agent, or Firm* — Sughrue Mion, PLLC

(57) ABSTRACT

A driving support apparatus is provided with: a first determinator configured to determine collision possibility of a vehicle; a first controller configured to perform deceleration, on the basis of the collision possibility; a second determinator configured to determine whether or not a driver has an intention to accelerate; a second controller configured to stop the deceleration performed by the first controller, if it is determined that the driver has the intention to accelerate; a third determinator configured to determine whether or not a driving operation by the driver is a predetermined erroneous operation; a third controller configured to suppress acceleration based on the driving operation if it is determined that the driving operation is the predetermined erroneous operation; and a fourth controller configured not to allow the second controller to stop the deceleration if the acceleration is suppressed by the third controller.

7 Claims, 9 Drawing Sheets

DRIVING SUPPORT APPARATUS

CROSS-REFERENCE TO RELATED APPLICATIONS

This application is based upon and claims the benefit of priority of the prior Japanese Patent Application No. 2016-001598, filed on Jan. 7, 2016, the entire contents of which are incorporated herein by reference.

BACKGROUND OF THE INVENTION

1. Field of the Invention

Embodiments of the present invention relate to a driving support apparatus configured to support driving of a vehicle by a driver.

2. Description of the Related Art

For this type of apparatus, there is known an apparatus configured to perform a plurality of types of driving support controls in accordance with various conditions. Japanese Patent Application Laid Open No. 2013-228928 discloses an apparatus provided with a plurality of driving support systems configured to issue a warning in accordance with each of the driver's consciousness deterioration, lane departure, and possibility/probability of collision with an obstacle. Particularly in this patent literature, there is proposed a technology in which if the issue of the warning by one driving support system is predicted, the issue of the warning by another driving support system, which has a lower priority than that of the one driving support system, is prohibited.

In the technology described in the aforementioned patent literature, it is determined whether or not the driving support control is prohibited, only on the basis of the priority of the respective driving operation systems. Thus, in some situations, the driving support control to be originally performed could not be appropriately performed.

Specifically in the case of combined use of first control in which a vehicle is decelerated on the basis of the collision possibility of the vehicle and second control in which acceleration of the vehicle is suppressed by detecting a driver's erroneous operation, usually, the first control is set to have a higher priority than that of the second control. Thus, if an execution condition of the first control is satisfied even during execution of the second control, the first control is performed, instead of the second control.

In particular, here, the driving support apparatus that can perform the first control is sometimes configured to cancel the execution of the first control (i.e. to prohibit the vehicle deceleration) if it is determined that the driver has an intention to accelerate. In this configuration, the first control is possibly canceled if the vehicle is accelerated by the driver's erroneous operation, which is an execution condition of the second control. In other words, even if the first control is to be performed with priority, not the first control but the second control is possibly performed.

SUMMARY

In view of the aforementioned problems, it is therefore an object of embodiments of the present invention to provide a driving support apparatus configured to appropriately perform a plurality of driving support controls.

<1>

The above object of embodiments of the present invention can be achieved by a driving support apparatus comprising: a first determinator configured to determine collision possibility of a vehicle; a first controller configured to perform deceleration of the vehicle, on the basis of the collision possibility of the vehicle; a second determinator configured to determine whether or not a driver of the vehicle has an intention to accelerate, on the basis of an operation of an accelerator pedal by the driver; a second controller configured to stop the deceleration of the vehicle performed by said first controller, if it is determined that the driver has the intention to accelerate; a third determinator configured to determine whether or not a driving operation by the driver is a predetermined erroneous operation including the operation of the accelerator; a third controller configured to further suppress acceleration of the vehicle based on the driving operation if it is determined that the driving operation is the predetermined erroneous operation, in comparison with a case of determination that the driving operation is not the predetermined erroneous operation; and a fourth controller configured not to allow said second controller to stop the deceleration of the vehicle, even if it is determined that the driver has the intention to accelerate, if the acceleration of the vehicle is suppressed by said third controller.

According to the driving support apparatus in embodiments of the present invention the deceleration of the vehicle based on the collision possibility of the vehicle is performed by the first controller. Moreover, if it is determined that the driver's driving operation is the predetermined erroneous operation including the operation of the accelerator, the acceleration of the vehicle is suppressed by the third controller.

The deceleration of the vehicle performed by the first controller is stopped by the second controller if it is determined that the driver has the intention to accelerate. In this case, even if the vehicle is accelerated by the predetermined erroneous operation, the deceleration performed by the first controller, which is first control, is possibly stopped. Specifically, the operation of the accelerator pedal included in the predetermined erroneous operation causes such an erroneous determination that the driver has the intention to accelerate, resulting in the possibility that the first control is stopped.

In embodiments of the present invention, however, if the acceleration of the vehicle is suppressed by the third controller, the control performed by the second controller is limited by the fourth controller. In other words, if the acceleration of the vehicle is suppressed by the third controller, the deceleration of the vehicle performed by the first controller is not stopped even if it is determined that the driver has the intention to accelerate. It is thus possible to allow the first controller to appropriately perform the deceleration of the vehicle.

<2>

In one aspect of the driving support apparatus according to embodiments of the present invention, wherein the predetermined erroneous operation is an operation of changing a shift from an R range to a D range while pressing the accelerator pedal.

According to this aspect, the acceleration of the vehicle is suppressed by the third controller in order to avoid a situation in which the vehicle moving in reverse is suddenly accelerated forward due to the shift range change. The above situation is caused by the driver's erroneous operation in many cases. Therefore, drive control can be performed, more appropriately, if it is configured not to allow the deceleration of the vehicle performed by the first controller to be stopped when the acceleration is suppressed by the third controller.

<3>

In another aspect of the driving support apparatus according to embodiments of the present invention, wherein the predetermined erroneous operation is an operation of changing a shift from a non-drive range to a drive range while pressing the accelerator pedal.

According to this aspect, the acceleration of the vehicle is suppressed by the third controller in order to avoid a situation in which the vehicle not moving is suddenly accelerated forward due to the shift range change. The above situation is caused by the driver's erroneous operation in many cases. Therefore, the drive control can be performed, more appropriately, if it is configured not to allow the deceleration of the vehicle performed by the first controller to be stopped when the acceleration is suppressed by the third controller.

<4>

In another aspect of the driving support apparatus according to embodiments of the present invention, wherein said second determinator determines whether or not the driver has the intention to accelerate, on the basis of at least one of a number of times of pressing the accelerator pedal, a time length of pressing the accelerator pedal, a rate of pressing the accelerator pedal, and an amount of pressing the accelerator pedal.

According to this aspect, the driver's acceleration intention can be determined, easily and accurately.

<5>

In another aspect of the driving support apparatus according to embodiments of the present invention, wherein said second determinator provisionally determines that the driver has no intention to accelerate if it is in an indeterminable state in which it cannot be correctly determined whether or not the driver has the intention to accelerate.

According to this aspect, the deceleration of the vehicle performed by the first controller is not stopped if it is in the indeterminable state. It is thus possible to prevent that the erroneous determination of the acceleration intention causes the deceleration of the vehicle performed by the first controller to be stopped.

<6>

In the aspect in which it is determined that the driver has no intention to accelerate if it is in the indeterminable state, the indeterminable state may be a state in which the driver is operating a brake pedal.

According to this aspect, the indeterminable state can be determined, easily and accurately, from whether or not the driver is operating the brake pedal.

<7>

Alternatively, in the aspect in which it is determined that the driver has no intention to accelerate if it is in the indeterminable state, the driving support apparatus may be further provided with a fifth controller configured to limit a speed of the vehicle to less than or equal to a speed set by the driver, and the indeterminable state may be a state in which the speed of the vehicle is limited by said fifth controller.

According to this aspect, the indeterminable state can be determined, easily and accurately, from whether or not the speed of the vehicle is limited by the fifth controller.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A driving support apparatus according to embodiments of the present invention will be explained with reference to the drawings. Hereinafter, two embodiments, which are a first embodiment and a second embodiment, will be explained.

First Embodiment

A driving support apparatus according to a first embodiment will be explained with reference to FIG. 1 to FIG. 7. Hereinafter, an explanation will be given in order, for a configuration of the driving support apparatus according to the first embodiment, outlines of pre-crash safety control and drive start control, which are driving support controls that can be performed by the driving support apparatus according to the first embodiment, problems in execution of the pre-crash safety control and the drive start control, operations of the driving support apparatus according to the first embodiment, and effects achieved by the driving support apparatus according to the first embodiment.

<Configuration of Driving Support Apparatus>

Figure 1:
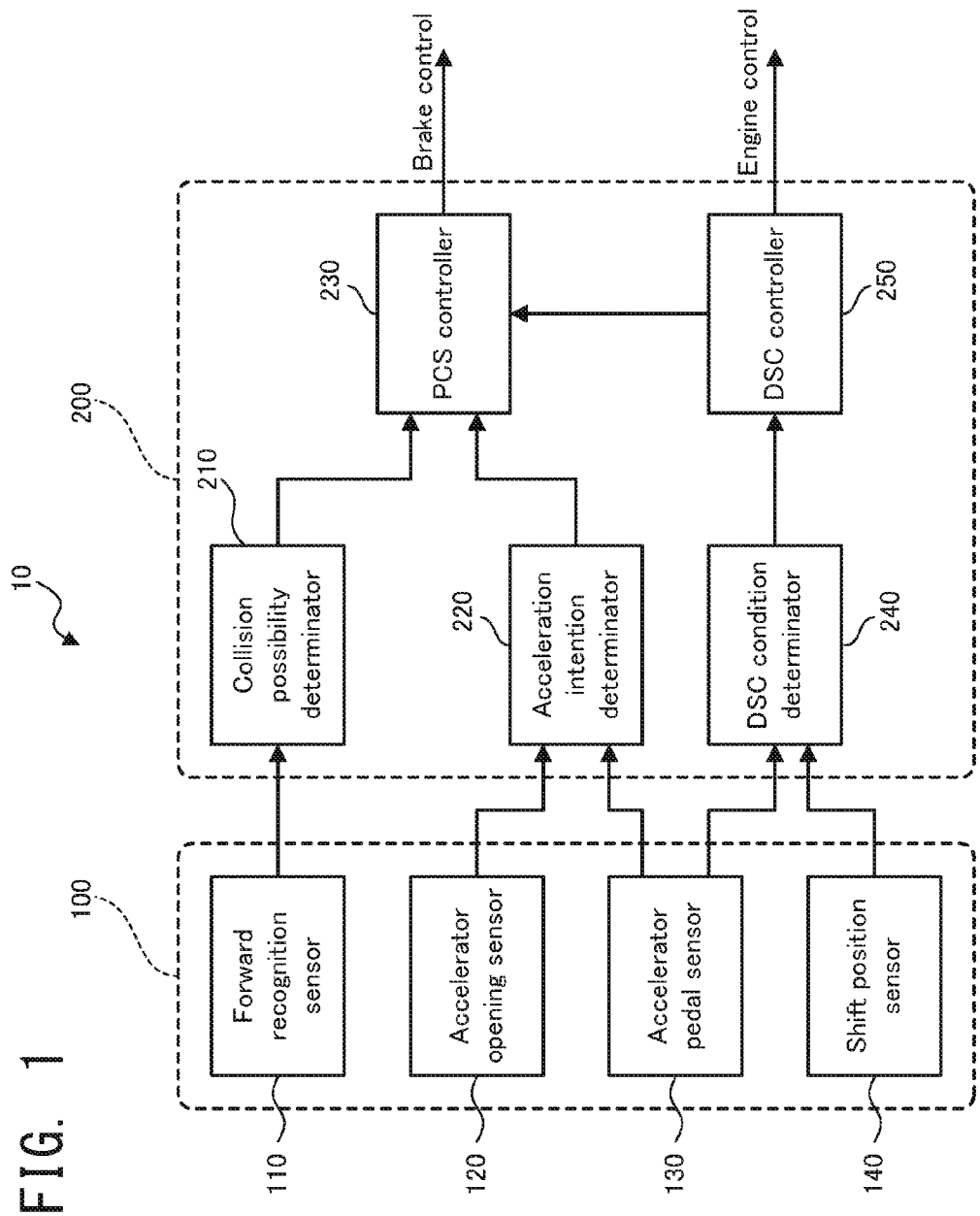
FIG. 1 is a block diagram illustrating a configuration of a driving support apparatus according to a first embodiment.

Firstly, the configuration of the driving support apparatus according to the first embodiment will be explained with reference to FIG. 1. FIG. 1 is a block diagram illustrating the configuration of the driving support apparatus according to the first embodiment.

In FIG. 1, a driving support apparatus 10 according to the first embodiment is mounted on a vehicle, such as an automobile, and is configured to perform driving support control for supporting driving by a driver. The driving support apparatus 10 is provided with a sensor group 100 and an electronic control unit (ECU) 200.

The sensor group 100 is provided with a forward recognition sensor 110, an accelerator opening sensor 120, an accelerator pedal sensor 130, and a shift position sensor 140. The sensor group 100 may include sensors other than the aforementioned sensors (e.g. a vehicle speed sensor, a yaw rate sensor, etc.), but illustration of the other sensors is omitted here.

The forward recognition sensor 100 is provided, for example, with an in-vehicle camera, a radar, and the like, and is a sensor configured to recognize an obstacle that exists ahead of or in front of the vehicle. Information regarding the obstacle recognized by the forward recognition sensor 100 is outputted to a collision possibility determinator 210 of the ECU 200.

The accelerator opening sensor 120 is a sensor configured to detect an accelerator opening degree of the vehicle (in other words, an opening degree of a throttle valve). Information regarding the accelerator opening degree detected by the accelerator opening sensor 120 is outputted to an acceleration intention determinator 220 of the ECU 200.

The accelerator pedal sensor 130 is a sensor configured to detect an operation of an accelerator pedal by the driver. The accelerator pedal sensor 130 is configured to not only simply detect whether or not the accelerator pedal is operated, but also detect the number of times of pressing the accelerator pedal per predetermined time, a time length of pressing the accelerator pedal, a rate of pressing the accelerator pedal, and an amount of pressing the accelerator pedal. Information regarding the operation of the accelerator pedal detected by the accelerator pedal sensor 130 is outputted to each of the acceleration intention determinator 220 and a DSC condition determinator 240 of the ECU 200.

The shift position sensor 140 is a sensor configured to detect a shift position of the vehicle (e.g. a D range, an R range, a P range, an N range, etc.). Information regarding the shift position detected by the shift position sensor 140 is outputted to the DSC condition determinator 240 of the ECU 200.

The ECU 200 is provided with the collision possibility determinator 210, the acceleration intention determinator 220, a pre-crash safety (PCS) controller 230, the drive start control (DSC) condition determinator 240, and a DSC controller 250.

The collision possibility determinator 210 is configured to determine whether or not there is a possibility that the vehicle collides with the obstacle, on the basis of the information regarding the obstacle recognized by the forward recognition sensor 120. The collision possibility determinator 210 may be configured to calculate a specific numerical value indicating the possibility that the vehicle collides with the obstacle. A determination result of the collision possibility determinator 210 is outputted to the PCS controller 230.

The acceleration intention determinator 220 is configured to determine whether or not the driver of the vehicle has an intention to accelerate, on the basis of the information regarding the accelerator opening degree detected by the accelerator opening sensor 120 and the information regarding the operation of the accelerator pedal detected by the accelerator pedal sensor 130. A determination result of the acceleration intention determinator 220 is outputted to the PCS controller 230.

The PCS controller 230 is configured to perform various processes regarding the pre-crash safety control, which is one of the driving support controls. Specifically, the PCS controller 230 is configured to determine whether or not to perform the pre-crash safety control on the basis of the determination result of the collision possibility determinator 210 and the determination result of the acceleration intention determinator 220, and is configured to control a brake of the vehicle in accordance with a determination result regarding the pre-crash safety control. Moreover, in particular, the PCS controller 230 according to the embodiment is configured to change an execution condition of the pre-crash safety control, depending on whether or not the DCS controller 250 is performing the drive start control.

The DSC condition determinator 240 is configured to determine whether or not an execution condition of the drive start control, which is one of the driving support controls, is satisfied, on the basis of the information regarding the operation of the accelerator pedal detected by the accelerator pedal sensor 130 and the information regarding the shift position detected by the shift position sensor 140. A determination result of the DSC condition determinator 240 is outputted to the DSC controller 250.

The DSC controller 250 is configured to perform various processes regarding the drive start control. Specifically, the DSC controller 250 is configured to suppress output of an engine (or a motor) in accordance with the determination result of the DSC condition determinator 240, thereby suppressing vehicle acceleration. Moreover, particularly, the DSC controller 250 according to the embodiment is configured to output information indicating whether or not the drive start control is being performed, to the PCS controller 230, thereby changing the execution condition of the pre-crash safety control on the PCS controller 230.

Each of the aforementioned parts of the ECU 200 may be configured as hardware provided for the ECU 200, or may be configured as a processing block that is realized by the ECU 200 using software. The collision possibility determinator 210 is one specific example of the "first determinator". The acceleration intention determinator 220 is one specific example of the "second determinator". The PCS controller 230 is one specific example of the "first controller", the "second controller", and the "fourth controller". The DSC condition determinator 240 is one specific example of the "third determinator". The DSC controller 250 is one specific example of the "third controller".

<Pre-Crash Safety Control>

Figure 2:
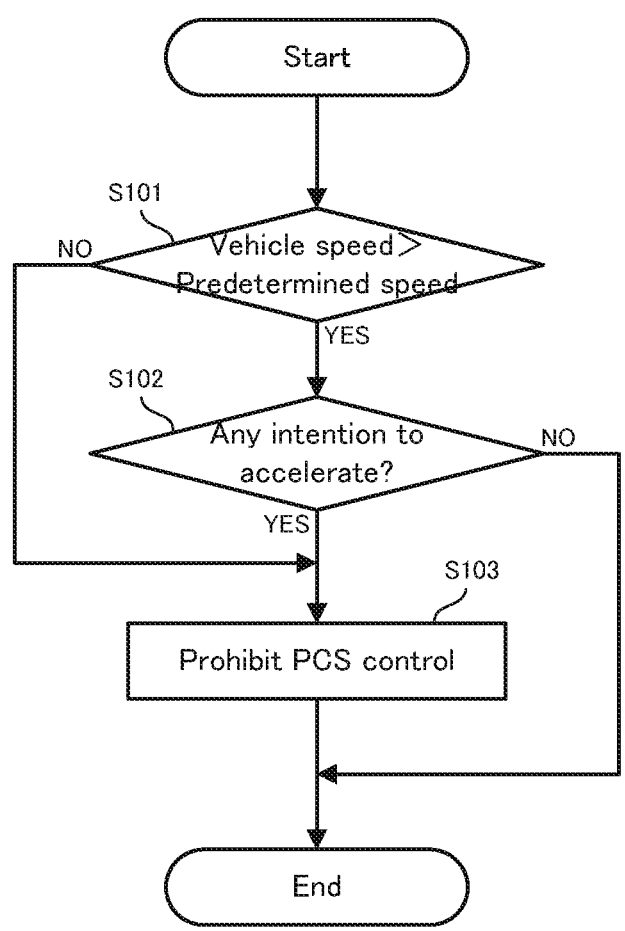
FIG. 2 is a flowchart illustrating a prohibition determining flow regarding pre-crash safety control.

Next, the pre-crash safety control performed by the PCS controller 230 will be specifically explained with reference to FIG. 2. FIG. 2 is a flowchart illustrating a prohibition determining flow regarding the pre-crash safety control. The flowchart illustrated in FIG. 2 indicates a control flow regarding a comparative example for explaining the outline of the pre-crash safety control, and there is a partially different part from a control flow of the driving support apparatus according to the embodiment.

The pre-crash safety control is automatic brake control performed to avoid the collision with the obstacle that exists ahead of or in front of the vehicle (i.e. control for applying a braking force to the vehicle). If an operating state of the pre-crash safety control is ON, the presence of the obstacle that exists ahead of or in front of the vehicle is monitored on the forward recognition sensor 110. If the obstacle is recognized, the possibility of the collision with the obstacle is determined on the collision possibility determinator 210, and the brake control is performed by the PCS controller 230 on the basis of the determination result. A more detailed explanation is omitted here because the pre-crash safety control can use the existing technologies/techniques.

In FIG. 2, the pre-crash safety control is not performed in some cases even though the operating state is ON. In other words, the brake control is not performed in some cases, even though it is determined that there is a possibility of the collision with the recognized obstacle. Hereinafter, prohibition determination regarding the pre-crash safety control will be specifically explained.

If the operating state of the pre-crash safety control is ON, it is determined whether or not a vehicle speed is greater than a predetermined speed (step S101). If it is determined that the vehicle speed is not greater than the predetermined speed (the step S101: NO), the execution of the pre-crash safety control is prohibited (step S103). The "predetermined speed" herein is a threshold value for determining whether or not the vehicle speed is high enough for the pre-crash safety control to be meaningful, and is obtained and set in advance by experiments or the like. In other words, the predetermined speed is a threshold value for avoiding that the pre-crash safety control is performed even at low speed that needs no collision avoidance.

On the other hand, if it is determined that the vehicle speed is greater than the predetermined speed (the step S101: YES), it is determined that the driver has an intention to accelerate (step S102). The driver's acceleration intention is determined by the acceleration intention determinator 220 on the basis of the information regarding the accelerator opening degree detected by the accelerator opening sensor 120 and the information regarding the operation of the accelerator pedal detected by the accelerator pedal sensor 130 (e.g. the number of times of pressing the accelerator pedal per predetermined time, a time length of pressing the accelerator pedal, a rate of pressing the accelerator pedal, an amount of pressing the accelerator pedal, etc.), as explained above.

More specifically, if the accelerator opening degree is greater than or equal to a predetermined opening degree, it is determined that the driver has the intention to accelerate, on the acceleration intention determinator 220. Moreover, if the amount of pressing the accelerator pedal is greater than or equal to a predetermined amount of pressing, it is determined that the driver has the intention to accelerate, on the acceleration intention determinator 220.

Moreover, on the acceleration intention determinator 220, the driver's acceleration intention may be determined on the basis of a plurality of types of information. Specifically, if the accelerator opening degree is greater than or equal to a predetermined opening degree and if the number of times of pressing the accelerator pedal is greater than or equal to a predetermined number of times of pressing, it is determined that the driver has the intention to accelerate, on the acceleration intention determinator 220. Alternatively, if the accelerator opening degree is greater than or equal to a predetermined opening degree and if the time length of pressing the accelerator pedal is greater than or equal to a predetermined time length of pressing, it is determined that the driver has the intention to accelerate, on the acceleration intention determinator 220. Alternatively, if the accelerator opening degree is greater than or equal to a predetermined opening degree and if the rate of pressing the accelerator pedal is greater than or equal to a predetermined rate of pressing, it is determined that the driver has the intention to accelerate, on the acceleration intention determinator 220.

Moreover, the value of the predetermined opening degree used when the driver's acceleration intention is determined on the basis of the plurality of types of information is preferably smaller than the value of the predetermined opening degree used when the driver's acceleration intention is determined only from the accelerator opening degree.

If it is determined that the driver has the intention to accelerate (the step S102: YES), the execution of the pre-crash safety control is prohibited, as in the case of the vehicle speed being not greater than the predetermined speed (step S103). It is because even if there is the possibility of the collision with the obstacle, the brake control unintended by the driver is performed if the pre-crash safety control is performed even when the driver has the intention to accelerate. Hereinafter, the prohibition of the pre-crash safety control based on the presence or absence of the acceleration intention will be referred to as accelerator override (AOR).

On the other hand, if it is determined that the driver has no intention to accelerate (the step S102: NO), the pre-crash safety control is not prohibited by the AOR. Thus, in this case, the brake control is performed on the basis of the possibility of the collision with the obstacle.

On the driving support apparatus 10 according to the embodiment, the execution or prohibition of the pre-crash safety control is determined, on the basis of whether or not the drive start control is being performed, in addition to the aforementioned condition. Control in this case will be detailed later.

<Drive Start Control>

Figure 3:
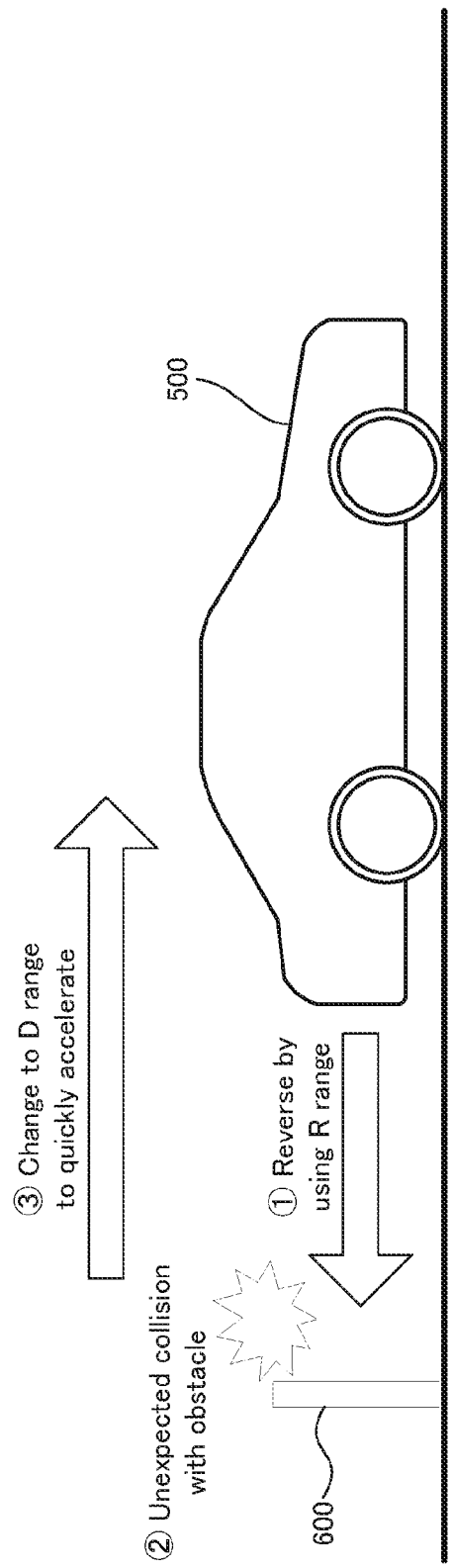
FIG. 3 is a conceptual diagram illustrating a specific example in which drive start control is performed.
Figure 4:
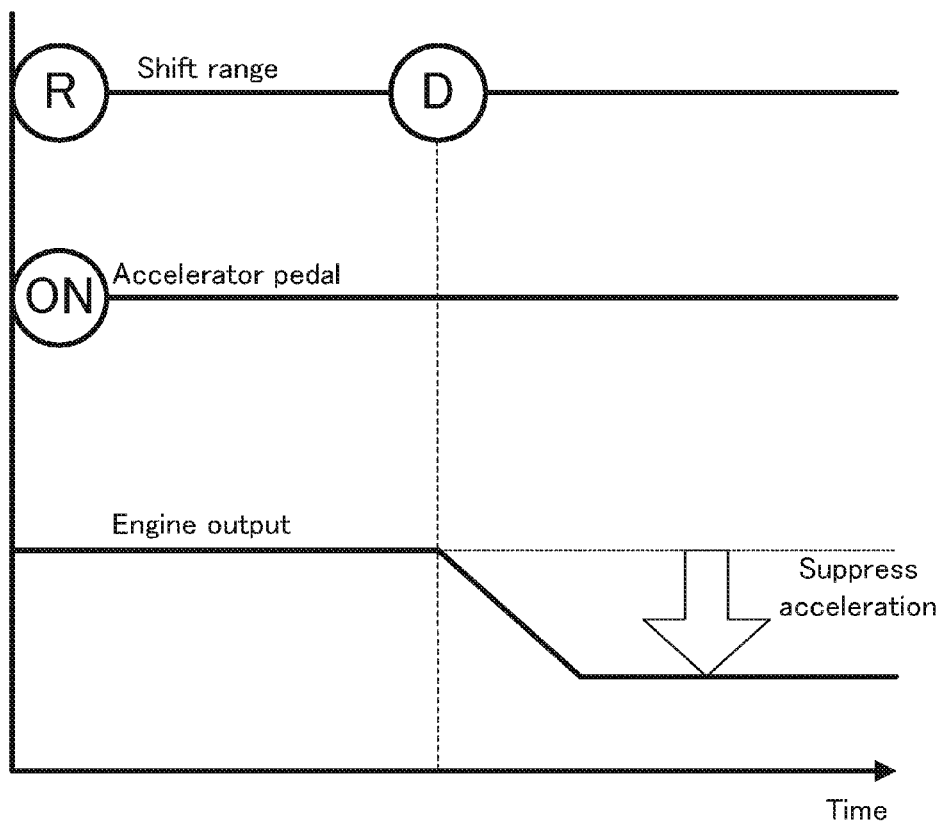
FIG. 4 is a time chart illustrating control content of the drive start control.

Next, the drive start control performed by the DSC controller 250 will be specifically explained with reference to FIG. 3 and FIG. 4. FIG. 3 is a conceptual diagram illustrating a specific example in which the drive start control is performed. FIG. 4 is a time chart illustrating control content of the drive start control.

Suppose that the driver reverses a vehicle 500 by using the R range, as illustrated in FIG. 3. In this situation, if the vehicle 500 collides with an unexpected obstacle like a pole 600, which exists behind the vehicle 500, the driver is surprised and sometimes changes a shift range to the D range in a hurry while pressing the accelerator pedal. Then, the vehicle 500 quickly accelerates forward. The drive start control is to suppress the quick acceleration of the vehicle 500 caused by the driver's erroneous operation as described above.

As illustrated in FIG. 4, if an operating state of the drive start control is ON, the shift range of the vehicle 500 and the operation of the accelerator pedal are monitored by the accelerator pedal sensor 130 and the shift position sensor 140. If the shift range is changed from the R range to the D range while the accelerator pedal is pressed, it is determined on the DSC condition determinator 240 that the execution condition of the drive start control is satisfied. As a result, the output of the engine (or the motor, etc.) is controlled by the DSC controller 250 to be reduced. This moderates the acceleration of the vehicle 500, and makes it possible to avoid a detrimental effect, such as collision caused by unexpected quick acceleration.

The aforementioned execution condition of the drive start control is one specific example of the "predetermined erroneous operation". A different condition from the aforementioned example can be set if the erroneous operation including the operation of the accelerator pedal can be determined. Specifically, the execution condition may be changing the shift position from a non-drive range to a drive range while pressing the accelerator pedal (e.g. changing from the P range to the D range, changing from the P range to the R range, changing from the N range to the R range, changing from the R range through the N range to the D range, etc.). Even if such conditions are set, the quick acceleration of the vehicle caused by the driver's erroneous operation can be suppressed.

<Problem Due to Combined Use of Driving Support Controls>

Figure 5:
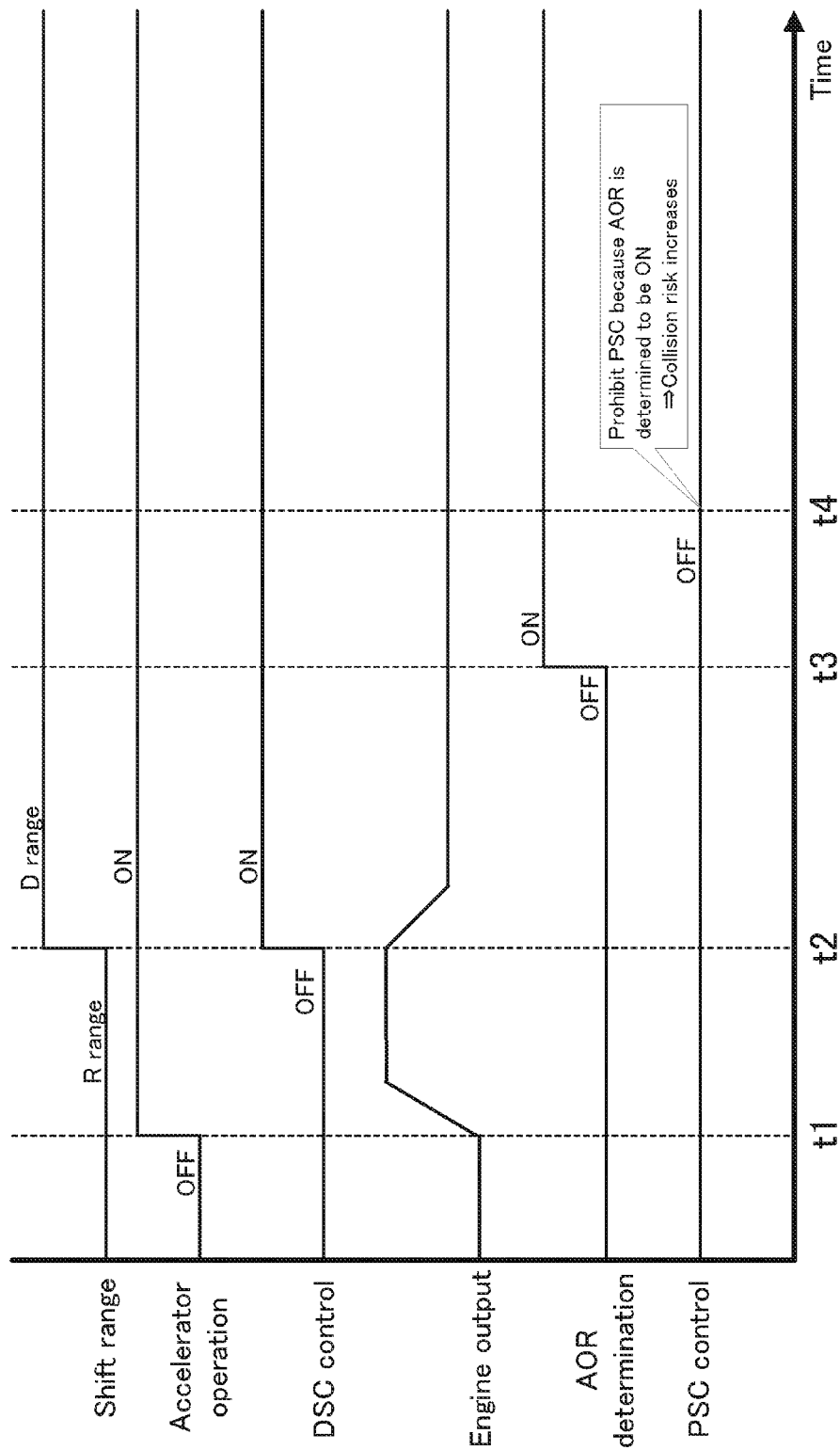
FIG. 5 is a time chart illustrating a possible problem caused by accelerator override of the pre-crash safety control.

Next, a possible problem in the case of combined use of the pre-crash safety control and the drive start control will be specifically explained with reference to FIG. 5. FIG. 5 is a time chart illustrating a possible problem caused by accelerator override of the pre-crash safety control.

In an example illustrated in FIG. 5, at a time point t1, the operation of the accelerator pedal is started, wherein the shift position is the R range. At a time point t2, the shift position is changed from the R range to the D range while the accelerator pedal is pressed. Such a driving operation matches the execution condition of the drive start control described above. Thus, the drive start control is performed from the time point t2, and the engine output is reduced.

Since the accelerator pedal is then kept pressed, the accelerator override is determined to be ON (i.e. it is determined that the driver has the intention to accelerate, and the pre-crash safety control is prohibited), at a time point t3. Thus, even at a time point t4, which is later than t3, the pre-crash safety control is not performed.

In the aforementioned example, it is determined that the driver has the intention to accelerate at the time point t3. As is clear from the fact that the drive start control is started before t3, the driver's driving operation is highly likely the erroneous operation. Thus, in the aforementioned situation, it is hard to say that the driver's acceleration intention is correctly determined. The prohibition of the pre-crash safety control in this situation is against the significance of the accelerator override, and may not be appropriate control.

The driving support apparatus 10 according to the embodiment performs the operations, which will be explained in detail below, in order to avoid the aforementioned problem.

<Operations of Driving Support Apparatus>

Figure 6:
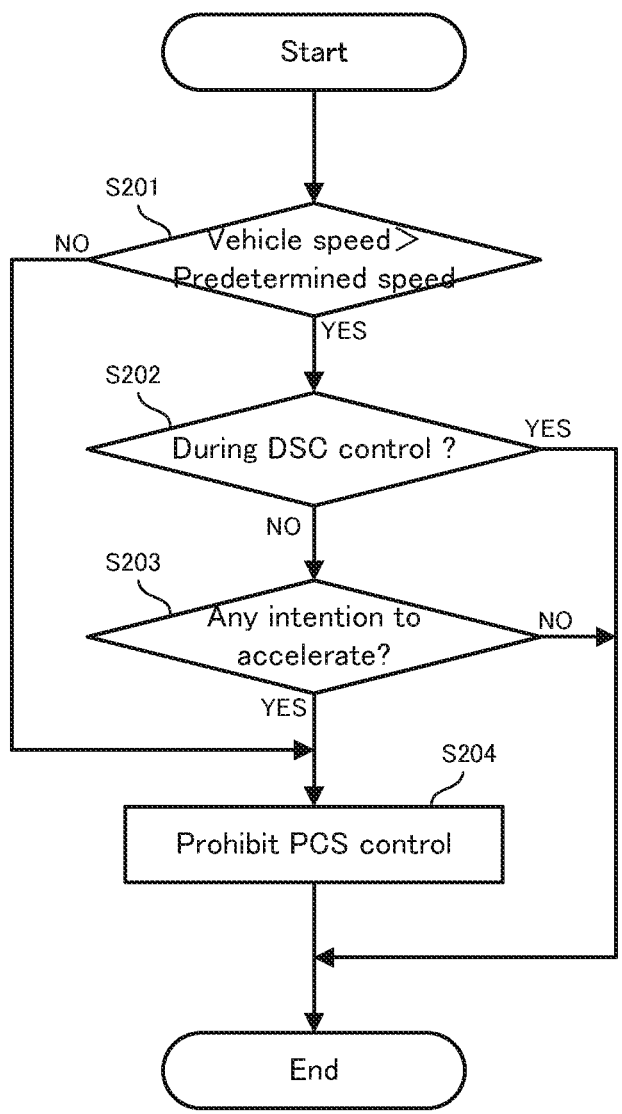
FIG. 6 is a flowchart illustrating operations of the driving support apparatus according to the first embodiment.

Next, the operations of the driving support apparatus 10 according to the first embodiment will be explained in detail with reference to FIG. 6. FIG. 6 is a flowchart illustrating the operations of the driving support apparatus 10 according to the first embodiment. The flowchart in FIG. 6 illustrates only processes deeply related to technical effects demonstrated by the first embodiment (mainly, processes performed by the PCS controller 230), out of various processes performed by the driving support apparatus 10.

In FIG. 6, in the driving support apparatus 10 according to the embodiment, if the operating state of the pre-crash safety control is ON, it is determined whether or not the vehicle speed is greater than a predetermined speed (step S201). This process is the same as that in the step S101.

If it is determined that the vehicle speed is greater than the predetermined speed (the step S201: YES), particularly in the embodiment, it is determined whether or not the drive start control is being performed (step S202). If it is determined that the drive start control is not being performed (i.e. that the acceleration is not suppressed by the DSC controller 250) (the step S202: NO), it is determined whether or not the driver has an intention to accelerate (step S203). In accordance with a result of the determination, the pre-crash safety control is prohibited (step S204). The processes in the step S203 and the step S204 are the same as those in the step S102 and the step S103 in FIG. 2.

On the other hand, if it is determined that the drive start control is being performed (i.e. that the acceleration is suppressed by the DSC controller 250) (the step S202: YES), the subsequent process is omitted. In this manner, during the execution of the drive start control, the pre-crash safety control is performed, without the driver's acceleration intention being determined. In other words, even if it is determined that the driver has the intention to accelerate, the pre-crash safety control is not prohibited during the execution of the driver start control.

<Effects of Embodiment>

Figure 7:
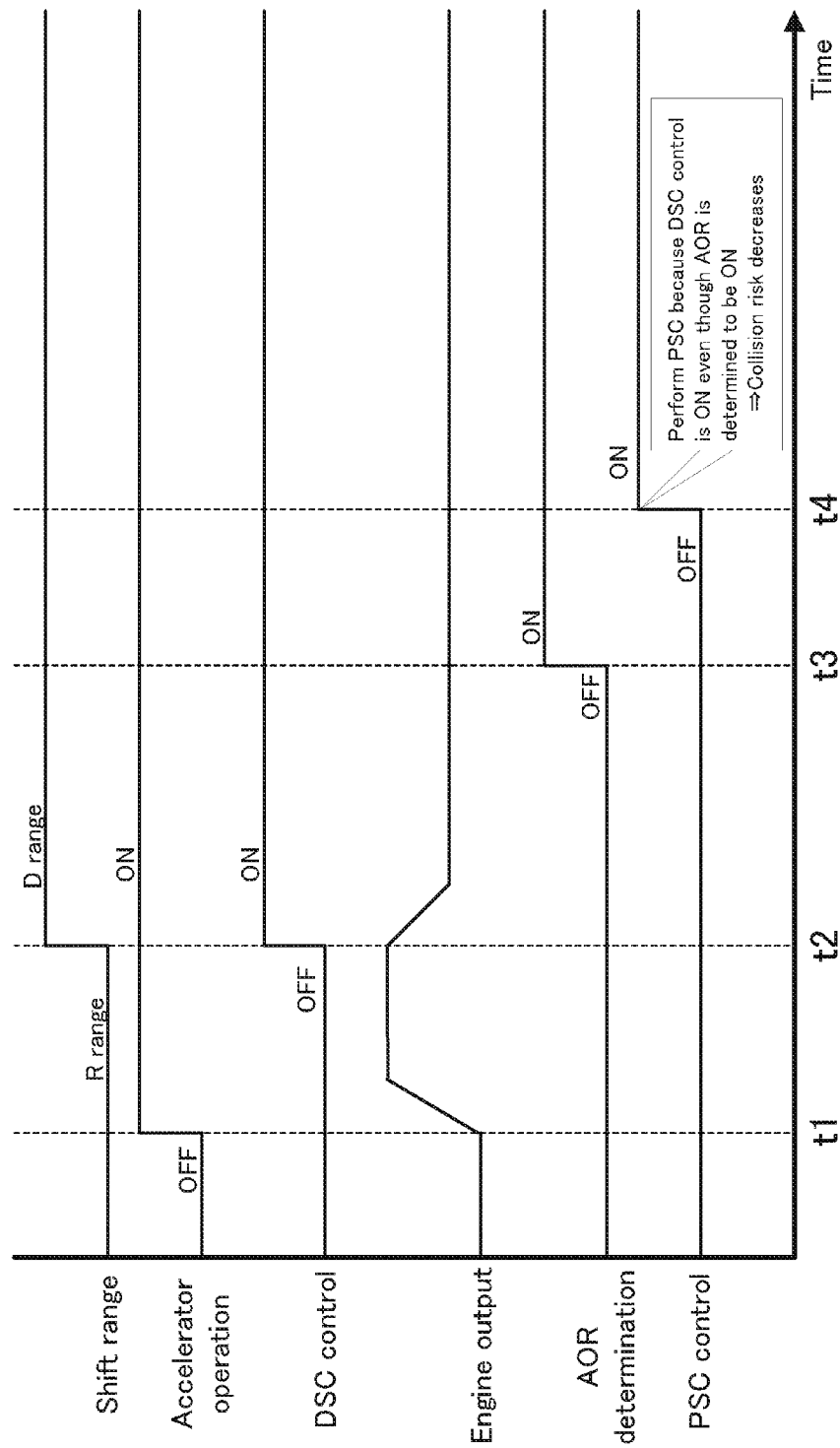
FIG. 7 is a time chart illustrating effects achieved by the driving support apparatus according to the first embodiment.

Next, the beneficial technical effects achieved by the driving support apparatus 10 according to the first embodiment will be explained in detail with reference to FIG. 7. FIG. 7 is a time chart illustrating the effects achieved by the driving support apparatus according to the first embodiment.

In FIG. 7, in the driving support apparatus 10 according to the embodiment, the pre-crash safety control is not prohibited by the accelerator override if the drive start control is being performed. Thus, in an example illustrated in FIG. 7, the pre-crash safety control is performed even at a time point t4 at which the accelerator override is determined to be ON. Therefore, even if there is an obstacle collision with which cannot be avoided only by the acceleration suppression by the drive start control, the pre-crash safety control makes it possible to reduce the vehicle speed and to certainly avoid the collision.

As explained above, according to the driving support apparatus 10 in the first embodiment, the pre-crash safety control is not prohibited by the override during the execution of the driving start control. It is thus possible to avoid that the acceleration intention is erroneously determined by the driver's erroneous operation and the pre-crash safety is not performed.

Second Embodiment

A driving support apparatus according to a second embodiment will be explained with reference to FIG. 8 and FIG. 9. The second embodiment is mostly the same as, but is partially different from the already explained first embodiment in configuration and operations. Thus, hereinafter, the different part from the first embodiment will be explained in detail, and an explanation for the other same part will be omitted. Hereinafter, an explanation will be given in order, for a configuration of the driving support apparatus according to the second embodiment, operations of the driving support apparatus according to the second embodiment, and effects achieved by the driving support apparatus according to the second embodiment.

<Configuration of Driving Support Apparatus>

Firstly, the configuration of the driving support apparatus according to the second embodiment will be explained with reference to FIG. 8. FIG. 8 is a block diagram illustrating the configuration of the driving support apparatus according to the second embodiment.

Figure 8:
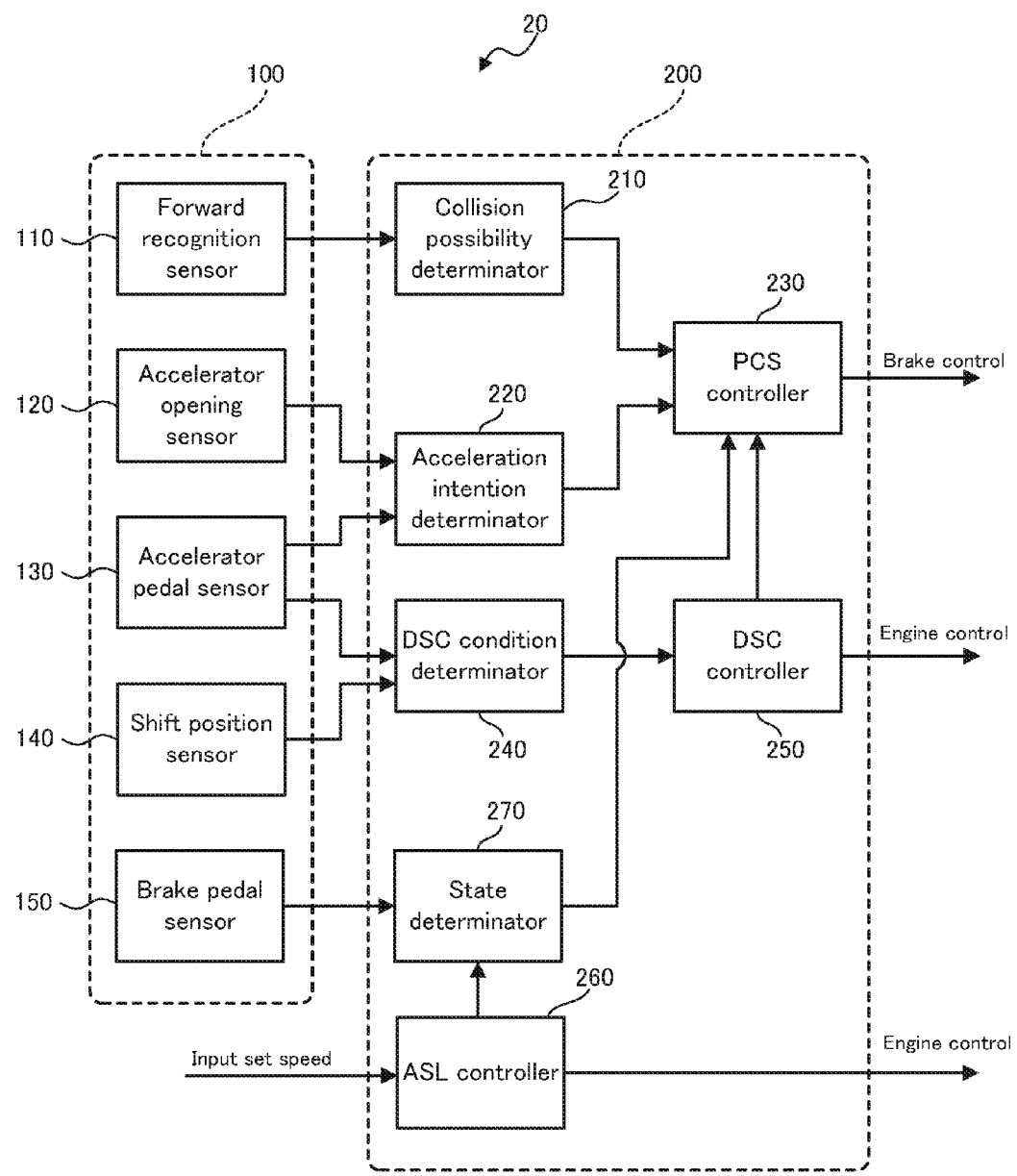
FIG. 8 is a block diagram illustrating a configuration of a driving support apparatus according to a second embodiment.

In FIG. 8, a driving support apparatus 20 according to the second embodiment is provided with a brake pedal sensor 150, an adjustable speed limiter (ASL) controller 260, and a state determinator 270, in addition to the configuration of the driving support apparatus 10 according to the first embodiment.

The brake pedal sensor 150 is one of the sensors included in the sensor group 100, and is configured to detect an operation of a brake pedal of the vehicle by the driver. Information regarding the operation of the brake pedal detected by the brake pedal sensor 150 is outputted to the state determinator 270 of the ECU 200.

The ASL controller 260 is configured to perform ASL control for limiting the vehicle speed to less than or equal to a predetermined set speed. Specifically, the ASL controller 260 is configured to perform control for automatically suppressing the output of the engine (or the motor, etc.) so that the vehicle speed does not exceed the predetermined set speed. The set speed of the ADS control can be freely set by the driver. Moreover, particularly, the ASL controller 260 according to the embodiment is configure to output information regarding whether or not the ADS control is being performed, to the state determinator 270.

The state determinator 270 is configured to determine whether or not it is in an indeterminable state in which the driver's acceleration intention cannot be correctly determined, on the basis of the information regarding the operation of the brake pedal detected by the brake pedal sensor 150, or on the basis of the information regarding whether or not the ASL control is being performed, which is inputted from the ASL controller 260.

Specifically, the state determinator 270 is configured to determine that it is in the indeterminable state if the brake pedal is operated. That is because if the brake pedal is operated, it cannot be concluded that the driver has the intention to accelerate, even if the acceleration intention can be determined from the information regarding the operation of the accelerator pedal and the accelerator opening degree. Alternatively, the state determinator 270 is configured to determine that it is in the indeterminable state if the ASL control is being performed by the ASL controller 260. That is because during ASL control, the driver possibly operates the accelerator pedal regardless of the driver's acceleration intention.

A determination result by the state determinator 270 is outputted to the PCS controller 230. The PCS controller 230 takes into account the determination result by the state determinator 270, and uses the determination result of the acceleration intention determinator 220. The state determinator 270 functions as one specific example of the "second determinator", together with the acceleration intention determinator 220.

<Operations of Driving Support Apparatus>

Next, the operations of the driving support apparatus 20 according to the second embodiment will be explained in detail with reference to FIG. 9. FIG. 9 is a flowchart illustrating the operations of the driving support apparatus 20 according to the second embodiment. The flowchart in FIG. 9 illustrates only processes deeply related to technical effects demonstrated by the second embodiment (mainly, processes performed by the PCS controller 230), out of various processes performed by the driving support apparatus 20.

Figure 9:
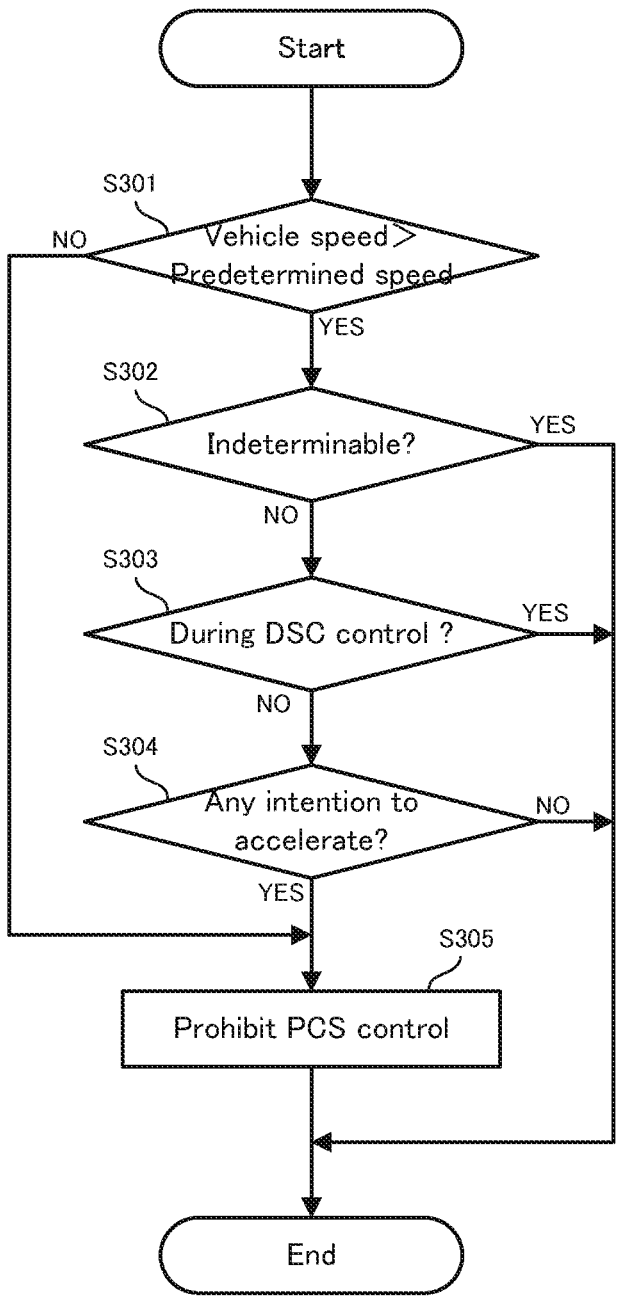
FIG. 9 is a flowchart illustrating operations of the driving support apparatus according to the second embodiment.

In FIG. 9, in the driving support apparatus 20 according to the second embodiment, if the operating state of the pre-crash safety control is ON, it is firstly determined whether or not the vehicle speed is greater than a predetermined speed (step S301). This process is the same as that in the step S201 in FIG. 6.

If it is determined that the vehicle speed is greater than the predetermined speed (the step S301: YES), particularly in the embodiment, it is determined whether or not it is in the indeterminable state (step S302). If it is determined that it is not in the indeterminable state (the step S302: NO), it is determined whether or not the drive start control is being performed (step S303) and it is determined whether or not the driver has an intention to accelerate (step S304). In accordance with results of the determination, the pre-crash safety control is prohibited (step S205). The processes in the step S303, the step S304, and the step S305 are the same as those in the step S202, the step S203, and the step S204 in FIG. 6.

On the other hand, if it is determined that it is in the indeterminable state (the step S302: YES), the subsequent process is omitted. By this, if it is in the indeterminable state, the pre-crash safety control is performed, without the driver's acceleration intention being determined. In other words, even if it is determined that the driver has the intention to accelerate, the pre-crash safety control is not prohibited in the indeterminable state.

<Effects of Embodiment>

Next, the beneficial technical effects achieved by the driving support apparatus 20 according to the second embodiment will be explained.

As explained with reference to FIG. 8 and FIG. 9, according to the driving support apparatus 20 in the second embodiment, the pre-crash safety control is not prohibited if it is determined to be in the indeterminable state. In other words, if it is determined to be in the indeterminable state, the same process is performed as when it is determined that the driver has no intention to accelerate. This is because it is provisionally determined that the driver has no intention to accelerate, which is because the acceleration intention cannot be correctly determined in the indeterminable state.

If the process is performed in the above manner, the pre-crash safety control is not prohibited by the accelerator override in the indeterminable state. It is therefore possible to avoid that the pre-crash safety control is not performed due to the erroneous determination of the acceleration intention.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A driving support apparatus comprising:
   a first determinator configured to determine collision possibility of a vehicle;
   a first controller configured to perform deceleration of the vehicle, on the basis of the collision possibility of the vehicle;
   a second determinator configured to determine whether or not a driver of the vehicle has an intention to accelerate, on the basis of an operation of an accelerator pedal by the driver;
   a second controller configured to stop the deceleration of the vehicle performed by said first controller, if it is determined that the driver has the intention to accelerate;
   a third determinator configured to determine whether or not a driving operation by the driver is a predetermined erroneous operation including the operation of the accelerator;
   a third controller configured to further suppress acceleration of the vehicle based on the driving operation if it is determined that the driving operation is the predetermined erroneous operation, in comparison with a case of determination that the driving operation is not the predetermined erroneous operation; and
   a fourth controller configured not to allow said second controller to stop the deceleration of the vehicle, even if it is determined that the driver has the intention to accelerate, if the acceleration of the vehicle is suppressed by said third controller.

2. The driving support apparatus according to claim 1, wherein the predetermined erroneous operation is an operation of changing a shift from an R range to a D range while pressing the accelerator pedal.

3. The driving support apparatus according to claim 1, wherein the predetermined erroneous operation is an operation of changing a shift from a non-drive range to a drive range while pressing the accelerator pedal.

4. The driving support apparatus according to claim 1, wherein said second determinator determines whether or not the driver has the intention to accelerate, on the basis of at least one of a number of times of pressing the accelerator pedal, a time length of pressing the accelerator pedal, a rate of pressing the accelerator pedal, and an amount of pressing the accelerator pedal.

5. The driving support apparatus according to claim 1, wherein said second determinator provisionally determines that the driver has no intention to accelerate if it is in an indeterminable state in which it cannot be correctly determined whether or not the driver has the intention to accelerate.

6. The driving support apparatus according to claim 5, wherein the indeterminable state is a state in which the driver is operating a brake pedal.

7. The driving support apparatus according to claim 5, wherein
    said driving support apparatus further comprises a fifth controller configured to limit a speed of the vehicle to less than or equal to a speed set by the driver, and
    the indeterminable state is a state in which the speed of the vehicle is limited by said fifth controller.

* * * * *